(12) United States Patent  (10) Patent No.:   US 12,662,393 B2
Matsumoto  (45) Date of Patent:       Jun. 23, 2026

(54) METHOD FOR PRODUCING LITHIUM METAL COMPOSITE OXIDE

(71) Applicant: Sumitomo Metal Mining Co., Ltd., Tokyo (JP)

(72) Inventor: Yuki Matsumoto, Niihama (JP)

(73) Assignee: Sumitomo Metal Mining Co., Ltd., Tokyo (JP)

( * ) Notice:   Subject to any disclaimer, the term of this patent is extended or adjusted under 35 U.S.C. 154(b) by 502 days.

(21) Appl. No.:   18/253,463

(22) PCT Filed:   Nov. 19, 2021

(86) PCT No.:   PCT/JP2021/042621

§ 371 (c)(1),
(2) Date:   May 18, 2023

(87) PCT Pub. No.:   WO2022/113904

PCT Pub. Date: Jun. 2, 2022

(65) Prior Publication Data

US 2024/0010519 A1      Jan. 11, 2024

(30) Foreign Application Priority Data

Nov. 24, 2020    (JP) ................................. 2020-194235

(51) Int. Cl.
C01G 53/50         (2025.01)
(52) U.S. Cl.
CPC ................................... C01G 53/50 (2013.01)
(58) Field of Classification Search
CPC .... C01G 51/50; C01G 51/502; C01G 51/504; C01G 51/506; C01G 51/51
See application file for complete search history.

(56) References Cited

U.S. PATENT DOCUMENTS 9,327,996  B2 *   5/2016   Kawahashi ............ C01G 53/44
10,266,918 B2 *   4/2019   Sakai ..................... C22C 19/03
(Continued)

FOREIGN PATENT DOCUMENTS

| JP | 05-085741 A | 4/1993 |
| JP | 2003-267729 A | 9/2003 |
| JP | 2008-159417 A | 7/2008 |
| JP | 2015-045035 A | 3/2015 |

(Continued)

OTHER PUBLICATIONS

English machine translation of JP2019075253 (2019).*

(Continued)

*Primary Examiner* — Richard M Rump
(74) *Attorney, Agent, or Firm* — RIMON P.C.

(57)            ABSTRACT

A method for producing a lithium metal composite oxide, in which, in a calcining step of calcining a substance to be calcined using calcining means, the substance to be calcined is a mixture of a metal composite compound and a lithium compound or a mixture raw material containing a reactant of the metal composite compound and the lithium compound, a content rate of Li in the substance to be calcined is more than 5 mass % and 10 mass % or less, the calcining means includes an inner wall, a main material of the inner wall is an alloy, the alloy contains Ni and Al, a content rate of the Ni with respect to a total amount of the alloy is 93 mass % or more and 95 mass % or less, and a content rate of the Al with respect to the total amount of the alloy is 3 mass % or more and 5 mass % or less.

14 Claims, 1 Drawing Sheet

(56)      References Cited

U.S. PATENT DOCUMENTS

| | | | | |
|---|---|---|---|---|
| 11,855,247 | B2 * | 12/2023 | Arimura ............... | H01M 4/525 |
| 2011/0250499 | A1 | 10/2011 | Hiratsuka | |
| 2012/0319037 | A1 | 12/2012 | Kawahashi et al. | |
| 2016/0215367 | A1 | 7/2016 | Sakai et al. | |

FOREIGN PATENT DOCUMENTS

| | | | | |
|---|---|---|---|---|
| JP | 2019-075253 | A | 5/2019 | |
| JP | 6646129 | B1 | 2/2020 | |
| JP | 2020-091093 | A | 6/2020 | |
| WO | 2010/113512 | A1 | 10/2010 | |
| WO | 2012/098724 | A1 | 7/2012 | |
| WO | 2013/073633 | A1 | 5/2013 | |
| WO | WO-2018070517 | A1 * | 4/2018 ........... | H01M 4/525 |
| WO | 2020/116631 | A1 | 6/2020 | |

OTHER PUBLICATIONS

English machine translation of WO2018070517 (2018).*
International Search Report issued in corresponding International Patent Application No. PCT/JP2021/042621, dated Jan. 18, 2022, with English translation.
Japanese Opposition No. 2023-700163 issued in Japanese Patent Application No. 2022-508798, dated Mar. 27, 2023, with partial English translation.
Ryoji Kanno, "Crystal structure and properties of materials for lithium battery," Journal of the crystallographic society of Japan, vol. 40, pp. 262-271, 1998.
Written Opinion received in corresponding Japanese Patent Application No. 2022-508798, dated Nov. 2, 2023, with partial translation.

* cited by examiner

METHOD FOR PRODUCING LITHIUM METAL COMPOSITE OXIDE

CROSS REFERENCE TO RELATED APPLICATIONS

This application is the U.S. National Phase under 35 U.S.C. § 371 of International Application No. PCT/JP2021/042621, filed on Nov. 19, 2021, which claims the benefit of Japanese Application No. 2020-194235, filed on Nov. 24, 2020, the entire contents of each are hereby incorporated by reference.

TECHNICAL FIELD

The present invention relates to a method for producing a lithium metal composite oxide.

BACKGROUND ART

As positive electrode active materials that are used for positive electrodes of lithium secondary batteries, lithium metal composite oxides are in use. A method for producing a lithium metal composite oxide includes a calcining step of calcining a substance to be calcined, for example, a mixture of a metal composite compound and a lithium compound, a reactant of a metal composite compound and a lithium compound, or the like.

A continuous calcining furnace or a fluidized calcining furnace is used in the calcining step.

For example, Patent Document 1 describes a calcining method in which calcining means having an inner wall is made of a nickel material is used.

CITATION LIST

Patent Document

[Patent Document 1]
  JP-A-2019-75253

SUMMARY OF INVENTION

Technical Problem

A conventional metal calcining furnace had a problem in that a contact member which comes into contact with a substance to be calcined is easily corroded. When the contact member is easily corroded, the contact member needs to be replaced, which reduces the production efficiency. The contact member is specifically the inner wall of the calcining furnace. Therefore, there has been a demand for a method enabling the efficient production of a lithium metal composite oxide capable of providing lithium secondary batteries with favorable battery performance.

The present invention has been made in view of the above-described circumstances, and an object of the present invention is to provide a method for efficiently producing a lithium metal composite oxide from which lithium secondary batteries having a high initial discharge capacity can be obtained.

Solution to Problem

The present invention includes [1] to [8].

[1] A method for producing a lithium metal composite oxide, in which, in a calcining step of calcining a substance to be calcined using calcining means, the substance to be calcined is a mixture of a metal composite compound and a lithium compound or a mixture raw material containing a reactant of the metal composite compound and the lithium compound, a content rate of Li in the substance to be calcined is more than 5 mass % and 10 mass % or less, the calcining means includes an inner wall, a main material of the inner wall is an alloy, the alloy contains Ni and Al, a content rate of the Ni with respect to a total amount of the alloy is 93 mass % or more and 95 mass % or less, and a content rate of the Al with respect to the total amount of the alloy is 3 mass % or more and 5 mass % or less.

[2] The production method according to [1], in which the lithium metal composite oxide is represented by a general formula (I).

$$Li[Li_x(Ni_{(1-y-z)}Co_yM_z)_{1-x}]O_2 \tag{I}$$

($-0.1 \leq x \leq 0.2$, $0 \leq y \leq 0.5$, $0 \leq z \leq 0.9$, $y+z<1$, and M represents one or more elements selected from the group consisting of Mn, Cu, Ti, Mg, Al, W, B, Mo, Nb, Zn, Sn, Zr, Ga, and V.)

[3] The production method according to [1] or [2], in which the alloy contains any one or both of Si and Mn.

[4] The production method according to [3], in which a content rate of the Si with respect to the total amount of the alloy is 0.5 mass % or more and 2.5 mass % or less.

[5] The production method according to [3], in which a content rate of the Mn with respect to the total amount of the alloy is more than 0 mass % and 1.0 mass % or less.

[6] The production method according to any one of [1] to [5], in which a calcining temperature in the calcining step is 100° C. or higher and 900° C. or lower.

[7] The production method according to any one of [1] to [6], in which the calcining means is a rotary kiln.

[8] The production method according to any one of [1] to [7], in which the calcining step includes a preliminary calcining step and a main calcining step, at least in the preliminary calcining step, calcining is performed using the calcining means, a calcining temperature in the preliminary calcining step is 100° C. or higher and 700° C. or lower, and a calcining temperature in the main calcining step is higher than 700° C. and 1000° C. or lower.

Advantageous Effects of Invention

According to the present invention, it is possible to provide a method for efficiently producing a lithium metal composite oxide from which lithium secondary batteries having a high initial discharge capacity can be obtained.

DESCRIPTION OF EMBODIMENTS

Figure 1:
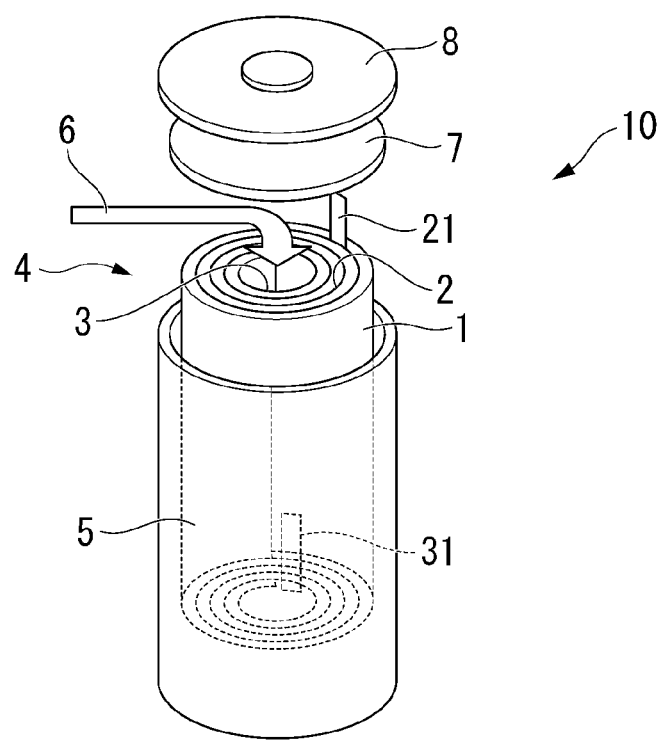
FIG. 1 is a schematic view showing an example of a lithium secondary battery.

In the present specification, a metal composite compound will be referred to as "MCC" below.

A lithium metal composite oxide will be referred to as "LiMO" below.

A positive electrode active material for a lithium secondary battery will be referred to as "CAM" below as an abbreviation for a cathode active material for a lithium secondary battery.

"Ni" refers not to a nickel metal but to a nickel atom. Similarly. "Co", "Li", and the like also each refer to a cobalt atom, a lithium atom, or the like.

In the present specification, the initial discharge capacity of a lithium secondary battery is measured by the following method.

<Measurement of Initial Discharge Capacity>

(Production of Positive Electrode for Lithium Secondary Battery)

LiMO that is produced by a production method of the present embodiment is used as CAM. CAM, a conductive material, and a binder are added in proportions at which the composition of CAM:conductive material:binder becomes 92:5:3 (mass ratio) and kneaded to prepare a paste-form positive electrode mixture. During the preparation of the positive electrode mixture, N-methyl-2-pyrrolidone is used as an organic solvent. Acetylene black is used as the conductive material. Polyvinylidene fluoride is used as the binder.

The obtained positive electrode mixture is applied to a 40 µm-thick Al foil, which is to serve as a current collector, and dried in a vacuum at 150° C. for 8 hours, thereby obtaining a positive electrode for a lithium secondary battery. The electrode area of this positive electrode for a lithium secondary battery is set to 1.65 cm$^2$.

(Production of Lithium Secondary Battery)

The following operation is performed in a glove box under an argon atmosphere.

The positive electrode for the lithium secondary battery that is produced in the section (Production of positive electrode for lithium secondary battery) is placed on the lower lid of a part for a coin-type battery R2032 (manufactured by Hohsen Corp.) with the aluminum foil surface facing downward, and a separator (polyethylene porous film) is placed on the positive electrode for the lithium secondary battery. 300 µl of an electrolyte solution is injected thereinto. As the electrolyte solution, an electrolyte solution obtained by dissolving LiPF$_6$ in a liquid mixture of ethylene carbonate, dimethyl carbonate, and ethyl methyl carbonate in a volume ratio of 30:35:35 in a proportion of 1.0 mol/l is used.

Next, lithium metal is used as a negative electrode, and the negative electrode is placed on the upper side of the laminated film separator. An upper lid is placed through a gasket and caulked using a caulking machine, thereby producing a lithium secondary battery (coin-type half cell R2032).

The initial discharge capacity is measured by the following method using the lithium secondary battery produced by the above-described method.

(Measurement Method)

The lithium secondary battery is left to stand at room temperature for 12 hours to sufficiently impregnate the separator and the positive electrode mixture layer with an electrolyte solution.

At a testing temperature of 25° C., the set current value is set to 0.2CA for both charging and discharging, and each of constant-current constant-voltage charging and constant-current discharging is performed. Metallic Li is used as a negative electrode, the maximum charge voltage is set to 4.3 V, and the minimum discharge voltage is set to 2.5 V The discharge capacity is measured, and the obtained value is defined as the "initial discharge capacity" (mAh/g).

Regarding the determination criteria of the discharge capacity, there are cases where the determination criteria differ depending on the composition of the lithium metal composite oxide. Specifically, the discharge capacity is determined by any of the following determination criterion A or determination criterion B.

Determination criteria A: When the initial discharge capacity is 180 mAh/g or more, the initial discharge capacity is evaluated as high.

Determination criteria B: When the initial discharge capacity is 170 mAh/g or more, the initial discharge capacity is evaluated as high.

The determination criteria A are used in a case where the content rate of Ni is 80% or more in the total amount of LiMO, and the determination criterion B is used in a case where the content rate of Ni is less than 80%.

<Measurement of Corrosion Rate and Growth Rate of Corrosion Product>

Whether or not LiMO can be efficiently produced in the present specification is confirmed by measuring the corrosion rate of a metal test piece and the growth rate of a corrosion product. The metal test piece is a model of an alloy that is the main material of the inner wall of the calcining means. As the values of the corrosion rate of the metal test piece and the growth rate of the corrosion product decrease, the production efficiency increases. The corrosion rate and the growth rate of the corrosion product are measured by the following method.

First, a metal test piece is prepared as the model of an alloy that is the main material of the inner wall of the calcining means.

Next, a predetermined amount of a substance to be calcined is loaded on one surface of the metal test piece and calcined. The substance to be calcined is, for example, a mixture of MCC and a lithium compound or a mixture raw material containing a reactant of MCC and a lithium compound.

The metal test piece is, for example, a plate-like test piece having a thickness of several millimeters.

As the calcining conditions, the substance to be calcined is held at 680° C. for 12 hours in an oxygen atmosphere.

The calcining is performed once or a plurality of times under the same conditions. In a case where the calcining is performed a plurality of times, the calcining is performed, for example, twice or more and 10 times or less under the same conditions. The same conditions mean that the calcining temperature, the calcining time, and the calcining atmosphere are the same. After the end of each calcining, a work of collecting an obtained calcined product and loading the substance to be calcined is performed, and then the next calcining is performed. The substance to be calcined that is loaded at this time is a mixture of MCC and a lithium compound or a mixture raw material containing a reactant of MCC and a lithium compound, and the same substance as the substance to be calcined loaded in the first calcining is used.

The thickness of the uncalcined metal test piece and the thickness of the metal test piece that has been calcined a plurality of times are each measured.

For the uncalcined metal test piece, the thickness of the metal test piece is measured with a micrometer. The thickness at this time is indicated by L1 (mm).

The thickness of the metal test piece means a value when the thickness at the center of the test piece is measured for the metal test piece.

At the time of measuring the thickness of the metal test piece that has been calcined a plurality of times, first, the center of the metal test piece is cut in the thickness direction to obtain a cross section. The obtained cross section is observed with a microscope to measure the thickness. The thickness at this time is indicated by L2 (mm). L2 means a value when the thickness has been measured.

The difference between L1 and L2 (L1−L2) is defined as the thickness change (mm).

In addition, on the obtained cross section, the thickness (mm) of a corrosion product formed on the surface of the metal test piece is measured with a microscope. The thickness of the corrosion product means a value when the thickness has been measured for the corrosion product.

(Corrosion Rate)

Furthermore, the corrosion rate is calculated from the obtained thickness change by the following formula.

> Corrosion rate (mm/year)=[thickness change (mm)×
> 24×365]/[holding time (h)×number of times of
> calcining]

When the corrosion rate is 5 mm/year or slower, it is evaluated that the corrosion rate is slow and the inner wall of the calcining means is not easily corroded.

(Growth Rate of Corrosion Product)

In addition, from the thickness of the obtained corrosion product, the growth rate of the corrosion product is calculated by the following formula.

> Growth rate (mm/year) of corrosion product=[thick-
> ness (mm) of corrosion product×24×365]/[hold-
> ing time (h)×number of times of calcining]

Regarding the growth rate of the corrosion product, there are cases where the determination criteria differ depending on the composition of the lithium metal composite oxide. Specifically, the growth rate of the corrosion product is determined by any of the following determination criterion 1 or determination criterion 2.

Determination criteria 1: When the growth rate of the corrosion product is 0.9 mm/year or slower, it is evaluated that the corrosion rate is slow and the inner wall of the calcining means is not easily corroded.

Determination criteria 2: When the growth rate of the corrosion product is 2.6 mm/year or slower, it is evaluated that the corrosion rate is slow and the inner wall of the calcining means is not easily corroded.

The determination criteria 1 are used in a case where the content rate of Li is 6.5 mass % or less in the total amount of LiMO, and the determination criterion 2 is used in a case where the content rate of Ni is more than 6.5 mass %.

<Method for Producing Lithium Metal Composite Oxide>

In a method for producing LiMO of the present embodiment, a calcining step of calcining an substance to be calcined using calcining means is an essential step. The method for producing LiMO preferably includes a step of obtaining MCC and a step of obtaining a mixture. Hereinafter, the step of obtaining MCC, the step of obtaining a mixture, and the calcining step will be described in order.

<<Step of Obtaining MCC>>

First, MCC containing a metal element other than lithium, that is, Co, Al, and an element M, which are random metals, and Ni are prepared.

Usually, MCC can be produced by a well-known batch coprecipitation method or continuous coprecipitation method. Hereinafter, a method for producing MCC will be described in detail using a metal composite hydroxide containing Ni, Co, and Al as metals as an example.

First, a nickel salt solution, a cobalt salt solution, an aluminum salt solution, and a complexing agent are reacted with one another by a coprecipitation method, particularly, a continuous method described in JP-A-2002-201028, thereby producing a metal composite hydroxide represented by $Ni_{(1-y-z)}Co_yAl_z(OH)_2$ (in the formula, y+z<1).

A nickel salt, which is the solute of the nickel salt solution, is not particularly limited, and, for example, any one or more of nickel sulfate, nickel nitrate, nickel chloride, and nickel acetate can be used.

As a cobalt salt that is a solute of the cobalt salt solution, for example, any one or more of cobalt sulfate, cobalt nitrate, cobalt chloride, and cobalt acetate can be used.

As an aluminum salt that is a solute of the aluminum salt solution, for example, for example, aluminum sulfate, sodium aluminate, or the like can be used.

The above-described metal salts are used in proportions corresponding to the composition ratio of $Ni_{(1-y-z)}Co_yAl_z(OH)_2$. In addition, as the solvent, water is used.

The complexing agent is a compound capable of forming a complex with ions of Ni, Co, and Al in aqueous solutions. Examples thereof include an ammonium ion feeder, hydrazine, ethylenediaminetetraacetic acid, nitrilotriacetic acid, uracil diacetic acid, and glycine.

As the ammonium ion feeder, ammonium salts such as ammonium hydroxide, ammonium sulfate, ammonium chloride, ammonium carbonate and ammonium fluoride are exemplary examples.

The complexing agent may not be contained, and, in a case where the complexing agent is contained, the amount of the complexing agent contained in the liquid mixture containing the nickel salt solution, the cobalt salt solution, the aluminum salt solution, and the complexing agent is, for example, more than 0 and 2.0 or less in terms of the mole ratio to the sum of the numbers of moles of the metal salts.

In the co-precipitation method, in order to adjust the pH value of the liquid mixture containing the nickel salt solution, the cobalt salt solution, the aluminum salt solution, and the complexing agent, an alkaline aqueous solution is added to the liquid mixture before the pH of the liquid mixture turns from alkaline into neutral. As the alkaline aqueous solution, sodium hydroxide or potassium hydroxide can be used.

The value of pH in the present specification is defined as a value measured when the temperature of the liquid mixture is 40° C. The pH of the liquid mixture is measured when the temperature of the liquid mixture sampled from a reaction vessel reaches 40° C.

In a case where the temperature of the sampled liquid mixture is lower than 40° C., the pH is measured when the liquid mixture has been heated to reach 40° C.

In a case where the temperature of the sampled liquid mixture is higher than 40° C., the pH is measured when the liquid mixture has been cooled to reach 40° C.

When the complexing agent in addition to the nickel salt solution, the cobalt salt solution, and the aluminum salt solution is continuously supplied to the reaction vessel, Ni, Co, and Al react with one another, and $Ni_{(1-y-z)}Co_yAl_z(OH)_2$ is generated.

A metal composite hydroxide represented by $Ni_{(1-y-z)}Co_yMn_z(OH)_2$ (in the formula, y+z<1) may be produced by reacting a nickel salt solution, a cobalt salt solution, a manganese salt solution, and a complexing agent with one another by the same method as the method for producing $Ni_{(1-y-z)}Co_yAl_z(OH)_2$.

As a manganese salt that is a solute of the manganese salt solution, for example, any of manganese sulfate, manganese nitrate, and manganese chloride can be used.

At the time of the reaction, the temperature of the reaction vessel is controlled in a range of, for example, 20° C. or higher and 80° C. or lower and preferably 30° C. or higher and 70° C. or lower.

In addition, at the time of the reaction, the pH value in the reaction vessel is controlled in a range of, for example, 9 or higher and 13 or lower and preferably 11 or higher and 13 or lower.

The substances in the reaction vessel are appropriately stirred and mixed together.

As the reaction vessel that is used in the continuous coprecipitation method, it is possible to use a reaction vessel in which the formed reaction precipitate is caused to overflow for separation.

The inside of the reaction vessel may be an inert atmosphere. In the inert atmosphere, it is possible to suppress the aggregation of elements that are more easily oxidized than nickel and to obtain a uniform metal composite hydroxide.

In addition, in the reaction vessel, an appropriate oxygen-containing atmosphere or an oxidizing agent may be present while maintaining an inert atmosphere.

In a case where the atmosphere in the reaction vessel is controlled with a gas species, a predetermined gas species may be passed into the reaction vessel or a reaction solution may be directly bubbled.

In addition to the control of the above-described conditions, the oxidation state of a reaction product may be controlled by supplying a variety of gases, for example, an inert gas such as nitrogen, argon, or carbon dioxide, an oxidizing gas such as an air or oxygen, or a gas mixture thereof to the reaction vessel.

As a compound that oxidizes the reaction product to be obtained, it is possible to use a peroxide such as hydrogen peroxide, a peroxide salt such as permanganate, perchloric acid, hypochlorous acid, nitric acid, halogen, ozone, or the like.

As a compound that reduces the reaction product to be obtained, it is possible to use an organic acid such as oxalic acid or formic acid, sulfite, hydrazine, or the like.

After the above-described reaction, the obtained reaction product is washed with water and then dried, whereby MCC is obtained. In addition, in a case where impurities derived from the liquid mixture remain in the reaction product that is washed with only water, the reaction product may be washed with a weak acid water, sodium hydroxide, or an alkaline solution containing potassium hydroxide as necessary.

In the above-described example, the nickel-cobalt-aluminum metal composite hydroxide is produced as MCC, but a nickel-cobalt-aluminum metal composite oxide may be prepared.

For example, a nickel-cobalt-aluminum metal composite oxide can be prepared by oxidizing a nickel-cobalt-aluminum metal composite hydroxide.

<<Step of Obtaining Mixture>>

MCC obtained by the above-described method and a lithium compound are mixed to obtain a mixture of MCC and the lithium compound.

As the lithium compound, one or more selected from the group consisting of lithium carbonate, lithium hydroxide, and lithium hydroxide monohydrate can be used.

The lithium compound and MCC are mixed in consideration of the composition ratio of a final target product to obtain a mixture. Specifically, the lithium compound and MCC are preferably mixed at proportions corresponding to the composition ratio of the composition formula (I) to be described below.

The mixture of MCC and the lithium compound may be heated prior to the calcining step to be described below. Heating of the mixture makes it possible to obtain a mixture raw material containing a reactant of MCC and the lithium compound. That is, the mixture raw material contains a reactant formed by a reaction between a part of the MCC in the mixture of MCC and the lithium compound and the lithium compound and may further contain MCC and the lithium compound.

The heating temperature at the time of heating the mixture of MCC and the lithium compound is, for example, 300° C. or higher and 700° C. or lower.

The mixture of MCC and the lithium compound or the mixture raw material containing a reactant of MCC and the lithium compound can be employed as a substance to be calcined in the calcining step to be described below.

The content rate of Li in the substance to be calcined is more than 5 mass % and 10 mass % or less, preferably 5.1 mass % or more and 9.9 mass % or less, and preferably 5.2 mass % or more and 9.8 mass % or less.

In addition, in one aspect of the present invention, as a preferable content rate of Li in the substance to be calcined, more than 5 mass % and 9.0 mass % or less, more than 5 mass % and 8.0 mass % or less, and more than 5 mass % and 7.0 mass % or less are exemplary examples.

When the content rate of Li in the substance to be calcined exceeds the above-described lower limit value, it is possible to produce LiMO in which a layer having lithium ion conductivity increases. Such LiMO is capable of improving the initial efficiency of lithium secondary batteries.

When the content rate of Li in the substance to be calcined is the above-described upper limit value or less, the inner wall of the calcining means is less likely to corrode. Therefore, a step for replacing a member of the calcining means or the like is less likely to occur, and the production efficiency improves.

The content rate of Li contained in the substance to be calcined is measured by the following method.

<Measurement of Content Rate of Li Contained in Substance to be Calcined>

The composition analysis of the substance to be calcined can be measured using an ICP emission spectrometer after dissolving the powder of the substance to be calcined in hydrochloric acid. As the ICP emission spectrometer, it is possible to use, for example, SPS3000 manufactured by Seiko Instruments Inc. The substance to be calcined is measured by ICP emission spectrometry to obtain the content rate of Li contained in the substance to be calcined. The "content rate of Li contained in the substance to be calcined" is the proportion of Li in the total amount of metal elements contained in the substance to be calcined.

<<Calcining Step>>

The substance to be calcined is calcined using the calcining means.

(Calcining Means)

The calcining means includes an inner wall that comes into direct contact with the substance to be calcined.

As the calcining means, for example, a rotary kiln or a roller hearth kiln is an exemplary example. In a case where the calcining means is a rotary kiln, the inner wall is, for example, a cylindrical kiln inner wall. In a case where the calcining means is a roller hearth kiln, the inner wall is, for example, an inner wall of a calcining container.

The calcining means is preferably a rotary kiln. The rotary kiln may be a continuous type or a batch type.

The main material of the inner wall is an alloy.

The "main material" in the present specification means a material that is contained most in the inner wall.

Hereinafter, the alloy, which is the main material of the inner wall, will be described.

The alloy contains Ni and Al.

The content rate of Ni with respect to the total amount of the alloy is 93 mass % or more and 95 mass % or less. The content rate of Al with respect to the total amount of the alloy is 3 mass % or more and 5 mass % or less.

When the content rate of Ni with respect to the total amount of the alloy is the lower limit value or more and the upper limit value or less, the inner wall of the calcining means is less likely to be corroded by the lithium compound.

When the content rate of Al with respect to the total amount of the alloy is the above-described lower limit value or more, it is conceivable that an aluminum oxide film is formed on the surface of the inner wall. The aluminum oxide film functions as a protective film, and the inner wall of the calcining means is less likely to be corroded by the lithium compound. When the content rate of Al with respect to the total amount of the alloy is the above-described upper limit value or less, it becomes easy to form an alloy with Ni.

When the main material is an alloy containing Ni and Al in a specific rate, the inner wall of the calcining means is less likely to be corroded by the lithium compound contained in the substance to be calcined. Therefore, a step for the replacement of an inner wall member or the repair of the calcining means is less likely to occur, and it is possible to efficiently produce LiMO capable of providing lithium secondary batteries exhibiting a high initial discharge capacity over a long period of time.

The alloy may contain any one or both of Si or Mn.

In a case where the alloy contains Si, the content rate of Si with respect to the total amount of the alloy, which is the main material, is preferably 0.5 mass % or more and 2.5 mass % or less and more preferably 0.7 mass % or more and 2.3 mass % or less.

In a case where the alloy contains Mn, the content rate of Mn with respect to the total amount of the alloy, which is the main material, is preferably more than 0 mass % and 1.0 mass % or less and more preferably 0.2 mass % or more and 0.8 mass % or less.

In a case where the alloy contains Si and Mn, the total amount of Si and Mn with respect to the total amount of the alloy, which is the main material, is preferably more than 0.5 mass % and 3.5 mass % or less. When Si or Mn is contained, it is conceivable that a film formed on the surface of the inner wall is less likely to break.

Examples of the alloy, which is the main material, will be described below.

Alloy consisting of Ni and Al

Alloy consisting of Ni, Al, and Si

Alloy consisting of Ni, Al, and Mn

Alloy consisting of Ni, Al, Si, and Mn

The composition of the alloy is obtained by the following method.

<Composition Analysis of Alloy>

The composition analysis of the alloy, which is the main material of the inner wall of the calcining means, is performed using a fluorescent X-ray spectrometer. This makes it possible to quantify the amount of metal elements in the alloy. The metal elements contained in the alloy are, for example, Ni, Al, Si, and Mn.

As the fluorescent X-ray spectrometer, for example, model: X-MET8000 manufactured by Hitachi High-Tech Corporation can be used. In addition, the amount may be quantified using a glow discharge mass spectrometer.

The calcining conditions may be one-stage calcining or two-stage calcining. LiMO can be obtained by one-stage calcining or two-stage calcining.

One-stage calcining is calcining in which the substance to be calcined is held at a specific calcining temperature for a certain period of time.

In the two-stage calcining, for example, the substance to be calcined is calcined by a preliminary calcining step, and the obtained preliminary calcined product is calcined by a main calcining step. The calcining temperature differs in the preliminary calcining step and in the main calcining step. Calcining at a temperature higher than the calcining temperature of the preliminary calcining step is defined as the main calcining step.

In the preliminary calcining step, the substance to be calcined is preferably calcined using the calcining means. When the preliminary calcining step is calcined using the calcining means, it is possible to efficiently produce LiMO capable of providing lithium secondary batteries exhibiting a high initial discharge capacity over a long period of time.

In the main calcining step, calcining may be performed using the above-described calcining means or the calcining means may be changed to other calcining means. Since the main calcining is performed at a higher temperature than that of the preliminary calcining, the inner wall is likely to be damaged during calcining. In this case, the inner wall is likely to be corroded by the lithium compound contained in the substance to be calcined. Therefore, the main calcining step is preferably performed with the above-mentioned calcining means.

In the case of one-stage calcining, the calcining temperature is preferably 100° C. or higher and 1000° C. or lower.

In the case of two-stage calcining, the calcining temperature is preferably 100° C. or higher and 1000° C. or lower in any of the preliminary calcining step and the main calcining step.

In particular, the calcining temperature in the preliminary calcining step is preferably 100° C. or higher and 700° C. or lower, and the main calcining step is preferably higher than 700° C. and 1000° C. or lower.

Regarding the calcining time, the total time taken while the temperature begins to be raised and reaches the calcining temperature and the holding of the composite metal hydroxide at the calcining temperature ends is preferably set to 1 hour or longer and 30 hours or shorter. The temperature rising rate in a heating step in which the highest holding temperature is reached is preferably 180° C./hour or faster and 2000° C./hour or slower, more preferably 200° C./hour or faster and 1900° C./hour or slower, and particularly preferably 250° C./hour or faster and 1800° C./hour or slower.

The highest holding temperature in the present specification is the highest temperature of the holding temperature of the atmosphere in a calcining furnace in a calcining step and means the calcining temperature in the calcining step. In the case of the calcining step having a plurality of heating steps, the highest holding temperature means the highest temperature in each calcining step.

The temperature rising rate in the present specification is calculated from the time taken while the temperature begins to be raised and reaches the highest holding temperature in a calcining device and a temperature difference between the temperature in the calcining furnace of the calcining device at the time of beginning to raise the temperature and the highest holding temperature.

The oxygen concentration of the calcining atmosphere in the calcining step is preferably 10 vol % or higher. The oxygen concentration of the calcining atmosphere in the calcining step is, for example, 50 vol % or higher or 60 vol % or higher.

In the case of two-stage calcining, regarding the calcining conditions of the preliminary calcining step and the main calcining step, both steps are preferably performed under the following combination.

(Preliminary Calcining Step)

Calcining temperature: 600° C. or higher and 700° C. or lower

Calcining time: 1 hour or longer and 15 hours or shorter

Calcining atmosphere: Oxygen atmosphere (Main Calcining Step)

Calcining temperature: Higher than 700° C. and 800° C. or lower

Calcining time: 5 hours or longer and 7 hours or shorter

Calcining atmosphere: Oxygen atmosphere

Washing Step

After the calcining, the obtained calcined product may be washed. For the washing, pure water or an alkaline washing liquid can be used.

<<Composition>>

LiMO produced by the production method of the present embodiment is preferably represented by the following general formula (I).

$$Li[Li_x(Ni_{(1-y-z)}Co_yM_z)_{1-x}]O_2 \qquad (I)$$

($-0.1 \leq x \leq 0.2$, $0 \leq y \leq 0.5$, $0 \leq z \leq 0.9$, $y+z<1$, and M represents one or more elements selected from the group consisting of Mn, Cu, Ti, Mg, Al, W, B, Mo, Nb, Zn, Sn, Zr, Ga, and V.)

(x)

From the viewpoint of obtaining a lithium secondary battery having high cycle characteristics, x is preferably more than 0, more preferably 0.01 or more, and still more preferably 0.02 or more. In addition, from the viewpoint of obtaining lithium secondary batteries having a higher initial coulombic efficiency, x is preferably 0.1 or less, more preferably 0.08 or less, and still more preferably 0.06 or less.

The upper limit value and lower limit value of x can be randomly combined together.

As the combination, x's of more than 0 and 0.1 or less, 0.01 or more and 0.08 or less, and 0.02 or more and 0.06 or less are exemplary examples.

The fact that the cycle characteristics are high means that the discharge capacity retention rate is high.

(y)

y is preferably 0.005 or more, more preferably 0.01 or more, and still more preferably 0.05 or more from the viewpoint of obtaining lithium secondary batteries having a low internal resistance of the battery. In addition, from the viewpoint of obtaining lithium secondary batteries having high thermal stability, y is preferably 0.4 or less, more preferably 0.35 or less, and particularly preferably 0.33 or less.

The upper limit value and lower limit value of y can be randomly combined together.

As the combination, y's of 0.005 or more and 0.4 or less, 0.01 or more and 0.35 or less, and 0.05 or more and 0.33 or less are exemplary examples.

(z)

In addition, from the viewpoint of obtaining a lithium secondary battery having high cycle characteristics, z is preferably 0.01 or more, more preferably 0.02 or more, and still more preferably 0.03 or more. In addition, from the viewpoint of obtaining a lithium secondary battery having high preservation characteristics at high temperatures (for example, in an environment at 60° C.), z is preferably 0.89 or less, more preferably 0.88 or less, and still more preferably 0.87 or less.

The upper limit value and lower limit value of z can be randomly combined together.

As the combination, z's of 0.01 or more and 0.89 or less, 0.02 or more and 0.88 or less, and 0.03 or more and 0.87 or less are exemplary examples.

M is one or more elements selected from the group consisting of Mn, Cu, Ti, Mg, Al, W, B. Mo. Nb, Zn, Sn, Zr, Ga, and V.

In addition, M is preferably one or more elements selected from the group consisting of Mn, Ti, Mg, Al, W, B, Zr, and Nb from the viewpoint of obtaining a lithium secondary battery having high cycle characteristics and preferably one or more elements selected from the group consisting of Mn, Al. W, B, Zr, and Nb from the viewpoint of obtaining a lithium secondary battery having high thermal stability.

<Composition Analysis>

The composition analysis of LiMO can be measured using an ICP emission spectrometer after dissolving the powder of the obtained LiMO in hydrochloric acid.

As the ICP emission spectrometer, it is possible to use, for example, SPS3000 manufactured by Seiko Instruments Inc.

<Lithium Metal Composite Oxide>

LiMO that is produced by a production method of the present embodiment can be suitably used as CAM.

<Lithium Secondary Battery>

The configuration of a lithium secondary battery that is suitable in a case where LiMO that is produced by the production method of the present embodiment is used as CAM will be described.

Furthermore, a positive electrode for a lithium secondary battery that is suitable in a case where LiMO that is produced by the production method of the present embodiment is used as CAM will be described. Hereinafter, the positive electrode for a lithium secondary battery will be referred to as the positive electrode in some cases. Furthermore, a lithium secondary battery that is suitable for an application of a positive electrode will be described.

An example of the lithium secondary battery that is suitable in a case where LiMO that is produced by the production method of the present embodiment is used as CAM has a positive electrode, a negative electrode, a separator interposed between the positive electrode and the negative electrode, and an electrolyte solution disposed between the positive electrode and the negative electrode.

An example of the lithium secondary battery has a positive electrode, a negative electrode, a separator interposed between the positive electrode and the negative electrode, and an electrolyte solution disposed between the positive electrode and the negative electrode.

FIG. 1 is a schematic view showing an example of a lithium secondary battery. For example, a cylindrical lithium secondary battery 10 is produced as described below.

First, as shown in FIG. 1, a pair of separators 1 having a strip shape, a strip-shaped positive electrode 2 having a positive electrode lead 21 at one end, and a strip-shaped negative electrode 3 having a negative electrode lead 31 at one end are laminated in order of the separator 1, the positive electrode 2, the separator 1, and the negative electrode 3 and are wound to form an electrode group 4.

Next, the electrode group 4 and an insulator, not shown, are accommodated in a battery can 5, and then the can bottom is sealed. The electrode group 4 is impregnated with an electrolyte solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be produced.

As the shape of the electrode group 4, for example, a columnar shape in which the cross-sectional shape becomes a circle, an ellipse, a rectangle, or a rectangle with rounded corners when the electrode group 4 is cut in a direction perpendicular to the winding axis is an exemplary example.

In addition, as the shape of a lithium secondary battery having such an electrode group 4, a shape that is specified by IEC60086, which is a standard for batteries specified by the International Electrotechnical Commission (IEC) or by JIS C 8500 can be adopted. For example, shapes such as a cylindrical shape and a square shape can be exemplary examples.

Furthermore, the lithium secondary battery is not limited to the winding-type configuration and may have a lamination-type configuration in which the laminated structure of the positive electrode, the separator, the negative electrode, and the separator is repeatedly overlaid. As the laminate-type lithium secondary battery, a so-called coin-type battery, button-type battery, or paper-type (or sheet-type) battery can be an exemplary example.

Hereinafter, each configuration will be described in order. (Positive Electrode)

The positive electrode can be produced by, first, adjusting a positive electrode mixture containing CAM, a conductive material, and a binder and supporting the positive electrode mixture by a positive electrode current collector. (Conductive Material)

As the conductive material in the positive electrode, a carbon material can be used. The carbon material is, for example, graphite powder, carbon black (for example, acetylene black), or a fibrous carbon material.

The proportion of the conductive material in the positive electrode mixture is preferably 5 parts by mass or more and 20 parts by mass or less with respect to 100 parts by mass of CAM. (Binder)

As the binder in the positive electrode, a thermoplastic resin can be used. Examples of the thermoplastic resin include polyimide resins, fluororesins, polyolefin resins, and resins described in WO2019/098384A1 or US2020/0274158A1.

The polyimide resins are, for example, polyvinylidene fluoride (hereinafter, referred to as PVdF in some cases).

The fluororesins are, for example, polytetrafluoroethylene.

The polyolefin resins are, for example, polyethylene, polypropylene, and the like. (Positive Electrode Current Collector)

As the positive electrode current collector in the positive electrode, a strip-shaped member formed of a metal material such as Al, Ni, or stainless steel as a forming material can be used.

As a method for supporting the positive electrode mixture by the positive electrode current collector, a method in which a paste of the positive electrode mixture is prepared using an organic solvent, the paste of the positive electrode mixture to be obtained is applied to and dried on at least one surface side of the positive electrode current collector, and the positive electrode mixture is fixed by performing an electrode pressing step is an exemplary example.

As the organic solvent that can be used in a case where the paste of the positive electrode mixture is prepared, N-methyl-2-pyrrolidone (hereinafter, referred to as NMP in some cases) is an exemplary example.

As the method for applying the paste of the positive electrode mixture to the positive electrode current collector, a slit die coating method, a screen coating method, a curtain coating method, a knife coating method, a gravure coating method, and an electrostatic spraying method are exemplary examples.

The positive electrode can be produced by the method exemplified above. (Negative Electrode)

It is required that, at a potential lower than that of the positive electrode, the negative electrode in the lithium secondary battery can be doped with lithium ions and lithium ions can be de-doped from the negative electrode. For example, an electrode in which a negative electrode mixture containing a negative electrode active material is supported by a negative electrode current collector and an electrode made of a negative electrode active material alone can be exemplary examples. (Negative Electrode Active Material)

As the negative electrode active material in the negative electrode, materials which are a carbon material, a chalcogen compound (oxide, sulfide, or the like), a nitride, a metal, or an alloy and can be doped with lithium ions and from which lithium ions can be de-doped at a lower potential than the positive electrode are exemplary examples.

As the carbon material that can be used as the negative electrode active material, graphite such as natural graphite or artificial graphite, cokes, carbon black, a carbon fiber, and an organic polymer compound-calcined body can be exemplary examples.

As oxides that can be used as the negative electrode active material, oxides of silicon represented by a formula $SiO_x$ (here, x is a positive real number) such as $SiO_2$ and SiO; oxides of tin represented by a formula $SnO_x$ (here, x is a positive real number) such as $SnO_2$ and SnO; metal composite oxides containing lithium and titanium such as $Li_4Ti_5O_{12}$ can be exemplary examples.

In addition, as the metal that can be used as the negative electrode active material, lithium metal, silicon metal, tin metal, and the like can be exemplary examples.

As a material that can be used as the negative electrode active material, the materials described in WO 2019/098384A1 or US2020/0274158A1 may be used.

These metals and alloys can be used as an electrode, mainly, singly after being processed into, for example, a foil shape.

Among the above-described negative electrode active materials, carbon materials containing graphite such as natural graphite or artificial graphite as a main component are preferably used. This is because the potential of the negative electrode rarely changes from an uncharged state to a fully charged state during charging (the potential flatness is favorable), the average discharge potential is low, and the capacity retention rate is high when the lithium secondary battery is repeatedly charged and discharged (the cycle characteristics are favorable). The shape of the carbon material may be, for example, any of a flaky shape such as natural graphite, a spherical shape such as mesocarbon microbeads, a fibrous shape such as a graphitized carbon fiber, or an aggregate of fine powder.

The negative electrode mixture may contain a binder as necessary. As the binder, thermoplastic resins can be exemplary examples, and specifically, PVdF, thermoplastic polyimide, carboxymethylcellulose (hereinafter, referred to as CMC in some cases), styrene-butadiene rubber (hereinafter, referred to as SBR in some cases) polyethylene, and polypropylene can be exemplary examples.

(Negative Electrode Current Collector)

As the negative electrode current collector in the negative electrode, a strip-shaped member formed of a metal material such as Cu, Ni, or stainless steel as the forming material can be an exemplary example.

As the method for supporting the negative electrode mixture by the negative electrode current collector, similarly to the case of the positive electrode, a method in which the negative electrode mixture is formed by pressurization and a method in which a paste of the negative electrode mixture is prepared using a solvent or the like, applied and dried on the negative electrode current collector, and then the negative electrode mixture is compressed by pressing are exemplary examples.

(Separator)

As the separator in the lithium secondary battery, it is possible to use, for example, a material that is made of a material such as a polyolefin resin such as polyethylene or polypropylene, a fluororesin, or a nitrogen-containing aromatic polymer and has a form such as a porous film, a non-woven fabric, or a woven fabric. In addition, the separator may be formed using two or more of these materials or the separator may be formed by laminating these materials. In addition, the separators described in JP-A-2000-030686 or US20090111025A1 may be used.

(Electrolyte Solution)

The electrolyte solution in the lithium secondary battery contains an electrolyte and an organic solvent.

As the electrolyte that is contained in the electrolyte solution, lithium salts such as $LiClO_4$, $LiPF_6$, and $LiBF_4$ are exemplary examples, and a mixture of two or more thereof may be used.

In addition, as the organic solvent that is contained in the electrolyte solution, for example, carbonates such as propylene carbonate, ethylene carbonate, dimethyl carbonate, diethyl carbonate, and ethyl methyl carbonate can be used.

As the organic solvent, two or more of the above-described organic solvents are preferably used in a mixture form. Among these, a solvent mixture containing a carbonate is preferable, and a solvent mixture of a cyclic carbonate and a non-cyclic carbonate and a solvent mixture of a cyclic carbonate and an ether are more preferable.

In addition, as the electrolyte solution, it is preferable to use an electrolyte solution containing a lithium salt containing fluorine such as $LiPF_6$ and an organic solvent having a fluorine substituent since the safety of lithium secondary batteries to be obtained is enhanced.

As the electrolyte and the organic solvent that are contained in the electrolyte solution, the electrolytes and the organic solvents described in WO2019/098384A1 or US2020/0274158A1 may be used.

<All-Solid-State Lithium Secondary Battery>

Next, a positive electrode for which LiMO that is produced by the production method of the present embodiment is used as CAM for an all-solid-state lithium secondary battery and an all-solid-state lithium secondary battery having this positive electrode will be described while describing the configuration of the all-solid-state lithium secondary battery.

Figure 2:
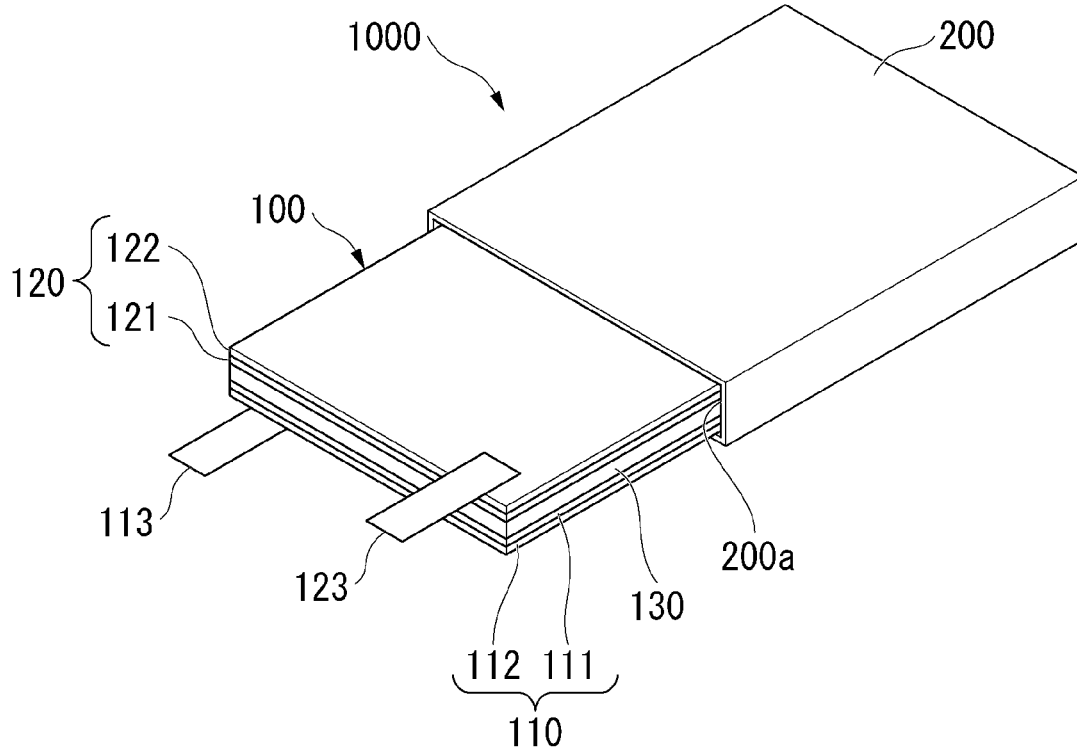
FIG. 2 is a schematic view showing an example of an all-solid-state lithium secondary battery.

FIG. 2 is a schematic view showing an example of an all-solid-state lithium secondary battery. An all-solid-state lithium secondary battery 1000 shown in FIG. 2 has a laminate 100 having a positive electrode 110, a negative electrode 120, and a solid electrolyte layer 130 and an exterior body 200 accommodating the laminate 100. In addition, the all-solid-state lithium secondary battery 1000 may have a bipolar structure in which a CAM and a negative electrode active material are disposed on both sides of a current collector. As specific examples of the bipolar structure, for example, the structures described in JP-A-2004-95400 are exemplary examples. A material that configures each member will be described below.

The laminate 100 may have an external terminal 113 that is connected to a positive electrode current collector 112 and an external terminal 123 that is connected to a negative electrode current collector 122. In addition, the all-solid-state lithium secondary battery 1000 may have a separator between the positive electrode 110 and the negative electrode 120.

The all-solid-state lithium secondary battery 1000 further has an insulator, not shown, that insulates the laminate 100 and the exterior body 200 from each other and a sealant, not shown, that seals an opening portion 200a of the exterior body 200.

As the exterior body 200, a container formed of a highly corrosion-resistant metal material such as aluminum, stainless steel or nickel-plated steel can be used. In addition, as the exterior body 200, a container obtained by processing a laminate film having at least one surface on which a corrosion resistant process has been performed into a bag shape can also be used.

As the shape of the all-solid-state lithium secondary battery 1000, for example, shapes such as a coin type, a button type, a paper type (or a sheet type), a cylindrical type, a square type, and a laminate type (pouch type) can be exemplary examples.

As an example of the all-solid-state lithium secondary battery 1000, a form in which one laminate 100 is provided is shown in the drawings, but the present embodiment is not limited thereto. The all-solid-state lithium secondary battery 1000 may have a configuration in which the laminate 100 is used as a unit cell and a plurality of unit cells (laminates 100) is sealed inside the exterior body 200.

Hereinafter, each configuration will be described in order.

(Positive Electrode)

The positive electrode 110 has a positive electrode active material layer 111 and a positive electrode current collector 112.

The positive electrode active material layer 111 contains CAM and a solid electrolyte. In addition, the positive electrode active material layer 111 may contain a conductive material and a binder.

(Solid Electrolyte)

As the solid electrolyte that is contained in the positive electrode active material layer 111, a solid electrolyte that has lithium ion conductivity and used in well-known all-solid-state lithium secondary batteries can be adopted. As the solid electrolyte, an inorganic electrolyte and an organic electrolyte can be exemplary examples.

As the inorganic electrolyte, an oxide-based solid electrolyte, a sulfide-based solid electrolyte, and a hydride-based solid electrolyte can be exemplary examples.

As the organic electrolyte, polymer-based solid electrolytes are exemplary examples.

As each electrolyte, the compounds described in WO2020/208872A1, US2016/0233510A1, US2012/0251871A1, and US2018/0159169A1 are exemplary examples, and examples thereof include the following compounds.

(Oxide-Based Solid Electrolyte)

As the oxide-based solid electrolyte, for example, a perovskite-type oxides, a NASICON-type oxide, a LISICON-type oxide, a garnet-type oxides, and the like are exemplary examples. Specific examples of each oxide include the compounds described in WO 2020/208872A1, US2016/0233510A1, and US2020/0259213A1, and, for example, the following compounds are exemplary examples.

As the garnet-type oxide. Li—La—Zr-based oxides such as $Li_7La_3Zr_2O_{12}$ (also referred to as LLZ) are exemplary examples.

The oxide-based solid electrolyte may be a crystalline material or an amorphous material (Sulfide-Based Solid Electrolyte)

As the sulfide-based solid electrolyte, $Li_2S$—$P_2S_5$-based compounds, $Li_2S$—$SiS_2$-based compounds, $Li_2S$—$GeS_2$-based compounds, $Li_2S$—$B_2S_3$-based compounds, LiI—$Si_2S$—$P_2S_5$-based compounds. LiI—$Li_2S$—$P^2O_5$-based compounds, LiI—$Li_3PO_4$—$P_2S_5$-based compounds, $Li_{10}GeP_2S_{12}$, and the like can be exemplary examples.

In the present specification, the expression "-based compound" that indicates the sulfide-based solid electrolyte is used as a general term for solid electrolytes mainly containing a raw material written before "-based compound" such as "$Li_2S$" or "$P_2S_5$". For example, the $Li_2S$—$P_2S_5$-based compounds include solid electrolytes mainly containing $Li_2S$ and $P_2S_5$ and further containing a different raw material. The proportion of $Li_2S$ that is contained in the $Li_2S$—$P_2S_5$-based compound is, for example, 50 to 90 mass % with respect to the entire $Li_2S$—$P_2S_5$-based compound. The proportion of $P_2S_5$ that is contained in the $Li_2S$—$P_2S_5$-based compound is, for example, 10 to 50 mass % with respect to the entire $Li_2S$—$P_2S_5$-based compound. In addition, the proportion of the different raw material that is contained in the $Li_2S$—$P_2S_5$-based compound is, for example, 0 to 30 mass % with respect to the entire $Li_2S$—$P_2S_5$-based compound. In addition, the $Li_2S$—$P_2S_5$-based compounds also include solid electrolytes containing $Li_2S$ and $P_2S_5$ in different mixing ratios.

As the $Li_2S$—$P_2S_5$-based compounds. $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—LiI—LiBr, and the like can be exemplary examples.

As the $Li_2S$—$SiS_2$-based compounds, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$SiS_2$—$P_2S_5$—LiCl, and the like are exemplary examples.

As the $Li_2S$—$GeS_2$-based compounds, $Li_2S$—$GeS_2$, $Li_2S$—$GeS_2$—$P_2S_5$, and the like are exemplary examples.

The sulfide-based solid electrolyte may be a crystalline material or an amorphous material.

Two or more solid electrolytes can be jointly used as long as the effect of the invention is not impaired.

(Conductive Material and Binder)

As the conductive material that the positive electrode active material layer 111 has, the materials described in the above-described (conductive material) can be used. In addition, as for the proportion of the conductive material in the positive electrode mixture, the proportions described in the above-described (conductive material) can be applied in the same manner. In addition, as the binder that the positive electrode has, the materials described in the above-described (binder) can be used.

(Positive Electrode Current Collector)

As the positive electrode current collector 112 that the positive electrode 110 has, the materials described in the above-described (positive electrode current collector) can be used.

As a method for supporting the CAM layer 111 by the positive electrode current collector 112, a method in which the positive electrode active material layer 111 is formed by pressurization on the positive electrode current collector 112 is an exemplary example. A cold press or a hot press can be used for the pressurization.

In addition, the positive electrode active material layer 111 may be supported by the positive electrode current collector 112 by preparing a paste of a mixture of CAM, the solid electrolyte, the conductive material, and the binder using an organic solvent to produce a positive electrode mixture, applying and drying the positive electrode mixture to be obtained on at least one surface of the positive electrode current collector 112, and fixing the positive electrode mixture by pressing.

In addition, the positive electrode active material layer 111 may be supported by the positive electrode current collector 112 by preparing a paste of a mixture of the CAM, the solid electrolyte, and the conductive material using an organic solvent to produce a positive electrode mixture, applying and drying the positive electrode mixture to be obtained on at least one surface of the positive electrode current collector 112, and sintering the positive electrode mixture.

As the organic solvent that can be used for the positive electrode mixture, the same organic solvent as the organic solvent that can be used in the case of preparing the paste of the positive electrode mixture described in the above-described (positive electrode current collector) can be used.

As a method of applying the positive electrode mixture to the positive electrode current collector 112, the methods described in the above-described section (positive electrode current collector) are exemplary example.

The positive electrode 110 can be produced by the method exemplified above. As a combination of specific materials that are used for the positive electrode 110, combinations of CAM and a solid electrolyte, a binder, and a conductive material, which are shown in Tables 1 to 3 are exemplary examples.

TABLE 1

| Solid electrolyte | Binder | Conductive material |
|---|---|---|
| Perovskite-type oxide | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |
| NASICON-type oxide | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |
| LISICON-type oxide | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |

TABLE 1-continued

| Solid electrolyte | Binder | Conductive material |
|---|---|---|
| Garnet-type oxide | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |

TABLE 2

| Solid electrolyte | Binder | Conductive material |
|---|---|---|
| $Li_2S—P_2S_5$-based compound | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |
| $Li_2S—SiS_2$-based compound | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |
| $Li_2S—GeS_2$-based compound | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |
| $Li_2S—B_2S_3$-based compound | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |

TABLE 3

| Solid electrolyte | Binder | Conductive material |
|---|---|---|
| $LiI—Si_2S—P_2S_5$-based compound | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |
| $LiI—Li_2S—P_2O_5$-based compound | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |

TABLE 3-continued

| Solid electrolyte | Binder | Conductive material |
|---|---|---|
| $LiI—Li_3PO_4—P_2S_5$-based compound | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |
| $Li_{10}GeP_2S_{12}$-based compound | Polyimide-based resin | Graphite powder<br>Carbon black<br>Fibrous carbon material |
| | Fluororesin | Graphite powder<br>Carbon black<br>Fibrous carbon material |
| | Polyolefin resin | Graphite powder<br>Carbon black<br>Fibrous carbon material |

(Negative Electrode)

The negative electrode 120 has a negative electrode active material layer 121 and the negative electrode current collector 122. The negative electrode active material layer 121 contains a negative electrode active material. In addition, the negative electrode active material layer 121 may contain a solid electrolyte and a conductive material. As the negative electrode active material, the negative electrode current collector, the solid electrolyte, the conductive material, and a binder, those described above can be used.

As a method for supporting the negative electrode active material layer 121 by the negative electrode current collector 122, similar to the case of the positive electrode 110, a method in which the negative electrode active material layer 121 is formed by pressurization, a method in which a paste-form negative electrode mixture containing a negative electrode active material is applied and dried on the negative electrode current collector 122 and then the negative electrode active material layer 121 is compressed by pressing, and a method in which a paste-form negative electrode mixture containing a negative electrode active material is applied, dried and then sintered on the negative electrode current collector 122 are exemplary examples.

(Solid Electrolyte Layer)

The solid electrolyte layer 130 has the above-described solid electrolyte.

The solid electrolyte layer 130 can be formed by depositing a solid electrolyte of an inorganic substance on the surface of the positive electrode active material layer 111 in the above-described positive electrode 110 by a sputtering method.

In addition, the solid electrolyte layer 130 can be formed by applying and drying a paste-form mixture containing a solid electrolyte on the surface of the positive electrode active material layer 111 in the above-described positive electrode 110. The solid electrolyte layer 130 may be formed by pressing the dried paste-form mixture and further pressurizing the paste-form mixture by a cold isostatic pressure method (CIP).

The laminate 100 can be produced by laminating the negative electrode 120 on the solid electrolyte layer 130 provided on the positive electrode 110 as described above using a well-known method in an aspect that the negative electrode active material layer 121 comes into contact with the surface of the solid electrolyte layer 130.

EXAMPLES

Next, the present invention will be described in more detail using examples.

<Composition Analysis>

The composition analysis of LiMO was performed by the method described in the above section <Composition analysis>.

<Measurement of Content Rate of Li Contained in Substance to be Calcined>

The content rate of Li contained in the substance to be calcined was performed by the method described in the above section <Measurement of content rate of Li contained in substance to be calcined>.

<Composition Analysis of Alloy>

The composition analysis of an alloy or metal contained in the calcining means was performed by the method described in the above section <Composition analysis of alloy>.

<Measurement of Corrosion Rate and Growth Rate of Corrosion Product>

The corrosion rate was performed by the method described in the above section <Measurement of Corrosion Rate and Growth Rate of Corrosion Product>.

Specifically, the following metal test pieces 1 to 3 were prepared as metal test pieces.

The sizes of the metal test pieces 1 to 3 were set to 20 mm in length, 25 mm in width, and 3 mm in thickness.

The metal test piece 1 is a metal test piece having a Ni content rate of 94 mass %, an Al content rate of 4 mass %, a Si content rate of 1.5 mass %, and a Mn content rate of 0.5 mass %.

The metal test piece 2 is a metal test piece having a Ni content rate of 62 mass %, a Cr content rate of 22 mass %, a W content rate of 14 mass %, and a Mo content rate of 2 mass %.

The metal test piece 3 is a metal test piece having a Ni content rate of 100 mass %.

<Measurement of Initial Discharge Capacity>

The initial discharge capacity of the lithium secondary battery was performed by the method described in the above section <Measurement of initial discharge capacity>.

Example 1

After water was poured into a reaction vessel including a stirrer and an overflow pipe, a sodium hydroxide aqueous solution was added thereto, and the liquid temperature was held at 50° C.

A nickel sulfate aqueous solution, a cobalt sulfate aqueous solution, and an aluminum sulfate aqueous solution were mixed together in proportions at which the atomic ratio of Ni, Co, and Al reached 88:9:3, thereby preparing a raw material liquid mixture.

Next, the raw material liquid mixture and an ammonium sulfate aqueous solution, as a complexing agent, were continuously added into the reaction vessel under stirring. A sodium hydroxide aqueous solution was timely added dropwise such that the pH of the solution in the reaction vessel reached 11.6 (when measured at a liquid temperature of 40° C.), and nickel-cobalt-aluminum composite hydroxide was obtained.

The nickel cobalt aluminum composite hydroxide was washed, then, dehydrated with a centrifuge, isolated, and dried at 105° C., thereby obtaining a nickel-cobalt-aluminum composite hydroxide 1.

The nickel-cobalt-aluminum composite hydroxide 1 and a lithium hydroxide monohydrate powder were weighed and mixed in proportions at which the mole ratio reached Li/(Ni+Co+Al) reached 1.10, thereby obtaining a substance 1 to be calcined.

The substance 1 to be calcined had a Li content rate of 6.3 mass %.

After that, the substance 1 to be calcined was calcined using a calcining furnace in which a plate-like alloy 1 was installed as a model of the inner wall of the calcining means.

As the alloy 1, an alloy having a Ni content rate of 94 mass %, an Al content rate of 4 mass %, a Si content rate of 1.5 mass %, and a Mn content rate of 0.5 mass % with respect to the total amount of the alloy was used.

The substance 1 to be calcined was placed on the alloy 1, and the substance 1 to be calcined was preliminarily calcined. At this time, the substance 1 to be calcined was calcined in a state of being in contact with the alloy 1, but not in contact with the inner wall of the calcining furnace.

The conditions for the preliminary calcining was set to 680° C. for 12 hours in an oxygen atmosphere. Next, the obtained preliminary calcined product was mainly calcined at 740° C. for 6 hours in an oxygen atmosphere and sieved, thereby obtaining LiMO of Example 1.

(Evaluation of Corrosion Rate and Growth Rate of Corrosion Product)

In addition, 3 g of the substance 1 to be calcined was placed on one side of the metal test piece 1 and calcined at 680° C. for 12 hours in an oxygen atmosphere. After the end of the calcining, a work of collecting the obtained calcined product, newly loading the substance 1 to be calcined, and calcining the substance 1 to be calcined under the same conditions was further repeated 7 times, and the corrosion rate and the growth rate of the corrosion product were evaluated. In Example 1, the total number of times of calcining is 8.

Comparative Example 1

LiMO of Comparative Example 1 was obtained in the same manner as in Example 1 except that the alloy 1 was changed to an alloy 2. As the alloy 2, an alloy having a Ni content rate of 62 mass %, a Cr content rate of 22 mass %, a W content rate of 14 mass %, and a Mo content rate of 2 mass % was used. In addition, the corrosion rate and the growth rate of the corrosion product were measured in the same manner as in Example 1 except that the metal test piece 1 was changed to the metal test piece 2.

Comparative Example 2

LiMO of Comparative Example 2 was obtained in the same manner as in Example 1 except that the alloy 1 was changed to a metal having a Ni content rate of 100 mass %. In addition, the corrosion rate and the growth rate of the corrosion product were measured in the same manner as in Example 1 except that the metal test piece 1 was changed to the metal test piece 3.

Comparative Example 3

LiMO of Comparative Example 3 was obtained in the same manner as in Example 1 except that the substance 1 to be calcined was changed to a substance 2 to be calcined having a Li content rate of 0.7 mass %. In addition, the corrosion rate and the growth rate of the corrosion product were measured in the same manner as in Example 1 except that 3 g of the substance 2 to be calcined was used and the number of times of calcining was set to a total of 4.

Comparative Example 4

LiMO of Comparative Example 4 was obtained in the same manner as in Example 1 except that the substance 1 to be calcined was changed to a substance 3 to be calcined having a Li content rate of 10.9 mass %. In addition, the corrosion rate and the growth rate of the corrosion product were measured in the same manner as in Example 1 except that 3 g of the substance 3 to be calcined was used and the number of times of calcining was set to a total of 3.

The compositions of produced LiMO, the Li content rates in the substances to be calcined, the compositions of the alloys, the corrosion rates of the metal test pieces, and the growth rates of the corrosion products in Example 1 and Comparative Examples 1 to 4 are shown in Table 4. Furthermore, the initial discharge capacities of the lithium secondary batteries for which LiMO produced in Example 1 and Comparative Examples 1 to 4 were used as CAM are shown in Table 4.

In all of Example 1 and Comparative Examples 1 to 4, the content rates of Ni in the total amount of LiMO were 80% or more, and thus the above-described determination criteria A were used for the evaluation of the initial discharge capacities.

In Example 1 and Comparative Examples 1 to 3, the content rates of Li in the total amount of LiMO were 6.5 mass % or less, and thus the above-described determination criteria 1 were used for the evaluation of the growth rates of the corrosion products.

In Comparative Example 4, the content rate of Li in the total amount of LiMO was more than 6.5 mass %, and thus the above-described determination criteria 2 were used for the evaluation of the growth rates of the corrosion products.

secondary battery to 180 mAh/g or more and to improve the performance of the lithium secondary battery.

The calcining conditions for the preliminary calcining and the main calcining in Example 1 reproduce the case of calcining using the calcining means having the inner wall for which the main material was the alloy 1. That is, from the results of Example 1, it is possible to sufficiently assume that, even in a case where the calcining means having the inner wall for which the main material is the alloy 1 was used, it is possible to efficiently produce LiMO, to increase the initial charge capacity of the lithium secondary battery to 180 mAh/g or more, and to improve the performance of the lithium secondary battery.

On the other hand, in Comparative Examples 1 and 2, it was possible to increase the initial charge capacities of the lithium secondary batteries; however, in Comparative Example 2, the corrosion rate of the metal test piece exceeded 5 mm/year, and, in Comparative Example 1, the growth rate of the corrosion product exceeded 0.9 mm/year. Therefore, it was indicated that, even in a case where calcining was performed using calcining means for which the main material of the inner wall was the alloy 2, the inner wall of the calcining means was likely to corrode. Therefore, it is found that Comparative Examples 1 and 2 are production methods less efficient than Example 1. In Comparative Example 3, since the content rate of Li in the substance to be calcined was low, it was possible to decrease the values of the corrosion rate of the metal test piece and the growth rate of the corrosion product. However, it is conceivable that, since the lithium conductive layer of the obtained LiMO was small, the initial charge capacity of the lithium secondary battery decreased.

In Comparative Example 4, since the content rate of Li in the substance to be calcined was high, the corrosion rate of the alloy was as high as 43.8 mm/year. In addition, the

TABLE 4

| | Lithium metal composite oxide Composition | Substance to be calcined Li content rate (mass %) | Alloy composition | | | | Corrosion rate (mm/year) | Corrosion product growth rate (mm/year) | Initial discharge capacity (mAh/g) |
|---|---|---|---|---|---|---|---|---|---|
| Example 1 | Ni/Co/Al = 88/9/3 | 6.5 | Ni [94 mass %] | Al [4 mass %] | Si [1.5 mass %] | Mn [0.5 mass %] | 1.8 | 0.82 | 183.9 |
| Comparative Example 1 | Ni/Co/Al = 88/9/3 | 6.5 | Ni [62 mass %] | Cr [22 mass %] | W [14 mass %] | Mo [2 mass %] | 1.8 | 0.91 | 178.3 |
| Comparative Example 2 | Ni/Co/Al = 88/9/3 | 6.5 | Ni [100 mass %] | | | | 31.9 | 60 | 182.7 |
| Comparative Example 3 | Ni/Co/Al = 88/9/3 | 0.7 | Ni [94 mass %] | Al [4 mass %] | Si [1.5 mass %] | Mn [0.5 mass %] | 1.8 | 0.91 | 1.2 |
| Comparative Example 4 | Ni/Co/Al = 88/9/3 | 11 | Ni [94 mass %] | Al [4 mass %] | Si [1.5 mass %] | Mn [0.5 mass %] | 43.8 | 41.4 | Unevaluable (collection impossible due to fixation) |

As shown in Table 4, it was possible to confirm that, in Example 1, the corrosion rate of the metal test piece was 5 mm/year or slower, the growth rate of the corrosion product was 0.9 mm/year or slower, the corrosion rate was slow, and the alloy was less likely to corrode. Therefore, it was indicated that Example 1 was a method capable of efficiently producing LiMO. Furthermore, in Example 1, it was possible to increase the initial charge capacity of the lithium growth rate of the corrosion product was also as high as 41.4 mm/year. Therefore, it was indicated that, even in a case where calcining was performed using calcining means for which the main material of the inner wall was Ni metal, the inner wall of the calcining means was likely to corrode. Therefore, it is found that Comparative Example 4 is a production method less efficient than Example 1. In Comparative Example 4, the substance to be calcined fixed to the alloy 1, which was the model of the inner wall of the calcining means, it was not possible to collect LiMO, and battery evaluation was not possible.

Example 2

After water was poured into a reaction vessel including a stirrer and an overflow pipe, a sodium hydroxide aqueous solution was added thereto, and the liquid temperature was held at 50° C.

A nickel sulfate aqueous solution, a cobalt sulfate aqueous solution, and a manganese sulfate aqueous solution were mixed together in proportions at which the atomic ratio of Ni, Co, and Mn reached 60:20:20, thereby preparing a raw material liquid mixture.

Next, the raw material liquid mixture and an ammonium sulfate aqueous solution, as a complexing agent, were continuously added into the reaction vessel under stirring. A sodium hydroxide aqueous solution was timely added dropwise such that the pH of the solution in the reaction vessel reached 11.6 (when measured at a liquid temperature of 40° C.), and nickel-cobalt-manganese composite hydroxide was obtained.

The nickel-cobalt-manganese composite hydroxide was washed, then, dehydrated with a centrifuge, isolated, and dried at 105° C., thereby obtaining a nickel cobalt manganese composite hydroxide 1.

The nickel-cobalt-manganese composite hydroxide 1 and a lithium hydroxide monohydrate powder were weighed and mixed in proportions at which the mole ratio reached Li/(Ni+Co+Mn) reached 1.10, thereby obtaining a substance to be calcined 11.

The substance 11 to be calcined had a Li content rate of 6.6 mass %.

LiMO of Example 2 was obtained in the same manner as in Example 1 except that the substance 11 to be calcined was used and the conditions for the main calcining were set to 955° C. for 5 hours in an oxygen atmosphere. In addition, the corrosion rate and the growth rate of the corrosion product were measured in the same manner as in Example 1 except that 3 g of the substance 11 to be calcined was used.

The composition of produced LiMO, the Li content rate in the substance to be calcined, the composition of the alloy, the corrosion rate of the metal test piece, and the growth rate of the corrosion product in Example 2 are shown in Table 5. Furthermore, the initial discharge capacity of the lithium secondary battery for which LiMO produced in Example 2 was used as CAM are shown in Table 5.

described determination criteria 2 were used for the evaluation of the growth rates of the corrosion products.

As shown in Table 5, it was possible to confirm that, in Example 2, the corrosion rate of the metal test piece was 5 mm/year or slower, the growth rate of the corrosion product was 2.6 mm/year or slower, the corrosion rate was slow, and the alloy was less likely to corrode. Therefore, it was indicated that Example 2 was a method capable of efficiently producing LiMO. Furthermore, in Example 2, it was possible to increase the initial charge capacity of the lithium secondary battery to 170 mAh/g or more and to improve the performance of the lithium secondary battery.

REFERENCE SIGNS LIST

1: Separator
3: Negative electrode
4: Electrode group
5: Battery can
6: Electrolyte solution
7: Top insulator
8: Sealing body
10: Lithium secondary battery
21: Positive electrode lead
100: Laminate
110: Positive electrode
111: Positive electrode active material layer
112: Positive electrode current collector
113: External terminal
120: Negative electrode
121: Negative electrode active material layer
122: Negative electrode current collector
123: External terminal
130: Solid electrolyte layer
200: Exterior body
200a: Opening portion
1000: All-solid-state lithium secondary battery

What is claimed is:

1. A method for producing a lithium metal composite oxide, wherein, in a calcining step of calcining a substance to be calcined using calcining means, the substance to be calcined is a mixture of a metal composite compound and a lithium compound or a mixture raw material containing a reactant of the metal composite compound

TABLE 5

| | Lithium metal composite oxide Composition | Mixture Li element content rate (mass %) | Calcining means Alloy composition | | | | Corrosion rate (mm/year) | Corrosion product growth rate (mm/year) | Initial discharge capacity (mAh/g) |
|---|---|---|---|---|---|---|---|---|---|
| Example 2 | Ni/Co/Mn = 60/20/20 | 6.6 | Ni [94 mass %] | Al [4 mass %] | Si [1.5 mass %] | Mn [0.5 mass %] | 0.9 | 2.6 | 173.5 |

In Example 2, the content rate of Ni in the total amount of LiMO was less than 80%, and thus the above-described determination criteria B were used for the evaluation of the initial discharge capacity.

In Example 2, the content rate of Li in the total amount of LiMO was more than 6.5 mass %, and thus the aboveand the lithium compound, a content rate of Li in the substance to be calcined is more than 5 mass % and 10 mass % or less, the calcining means includes an inner wall, a main material of the inner wall is an alloy, and the alloy is one of the following:

(1) an alloy consisting of Ni and Al, (2) an alloy consisting of Ni, Al, and Si, (3) an alloy consisting of Ni, Al, and Mn, or (4) an alloy consisting of Ni, Al, Si, and Mn, a content rate of the Ni with respect to a total amount of the alloy is 93 mass % or more and 95 mass % or less, and a content rate of the Al with respect to the total amount of the alloy is 3 mass % or more and 5 mass % or less.

2. The production method according to claim 1, wherein the lithium metal composite oxide is represented by a general formula (I), $$\text{Li}[\text{Li}_x(\text{Ni}_{(1-y-z)}\text{Co}_y\text{M}_z)_{1-x}]\text{O}_2 \qquad (\text{I}).$$

3. The production method according to claim 1, wherein the alloy is one of the following:

(2) the alloy consisting of Ni, Al, and Si, (3) the alloy consisting of Ni, Al, and Mn, or (4) the alloy consisting of Ni, Al, Si, and Mn.

4. The production method according to claim 3, wherein the alloy is one of the following:

(2) the alloy consisting of Ni, Al, and Si, or (4) the alloy consisting of Ni, Al, Si, and Mn, and wherein a content rate of the Si with respect to the total amount of the alloy is 0.5 mass % or more and 2.5 mass % or less.

5. The production method according to claim 3, wherein the alloy is one of the following:

(3) the alloy consisting of Ni, Al, and Mn, or (4) the alloy consisting of Ni, Al, Si, and Mn, and wherein a content rate of the Mn with respect to the total amount of the alloy is more than 0 mass % and 1.0 mass % or less.

6. The production method according to claim 1, wherein a calcining temperature in the calcining step is 100° C. or higher and 900° C. or lower.

7. The production method according to claim 1, wherein the calcining means is a rotary kiln.

8. The production method according to claim 1, wherein the calcining step includes a preliminary calcining step and a main calcining step, at least in the preliminary calcining step, calcining is performed using the calcining means, a calcining temperature in the preliminary calcining step is 100° C. or higher and 700° C. or lower, and a calcining temperature in the main calcining step is higher than 700° C. and 1000° C. or lower.

9. The production method according to claim 2, wherein the alloy is one of the following:

(2) the alloy consisting of Ni, Al, and Si, (3) the alloy consisting of Ni, Al, and Mn, or (4) the alloy consisting of Ni, Al, Si, and Mn.

10. The production method according to claim 9, wherein the alloy is one of the following:

(2) the alloy consisting of Ni, Al, and Si, or (4) the alloy consisting of Ni, Al, Si, and Mn, and wherein a content rate of the Si with respect to the total amount of the alloy is 0.5 mass % or more and 2.5 mass % or less.

11. The production method according to claim 9, wherein the alloy is one of the following:

(3) the alloy consisting of Ni, Al, and Mn, or (4) the alloy consisting of Ni, Al, Si, and Mn, and wherein a content rate of the Mn with respect to the total amount of the alloy is more than 0 mass % and 1.0 mass % or less.

12. The production method according to claim 2, wherein a calcining temperature in the calcining step is 100° C. or higher and 900° C. or lower.

13. The production method according to claim 2, wherein the calcining means is a rotary kiln.

14. The production method according to claim 2, wherein the calcining step includes a preliminary calcining step and a main calcining step, at least in the preliminary calcining step, calcining is performed using the calcining means, a calcining temperature in the preliminary calcining step is 100° C. or higher and 700° C. or lower, and a calcining temperature in the main calcining step is higher than 700° C. and 1000° C. or lower.

* * * * *